(12) United States Patent
Weksler et al.

(10) Patent No.: US 11,083,036 B1
(45) Date of Patent: Aug. 3, 2021

(54) VEHICLE SELECTION OF DEVICE TO USE TO EXECUTE FUNCTION

(71) Applicant: Lenovo (Singapore) Pte. Ltd., Singapore (SG)

(72) Inventors: Arnold S. Weksler, Raleigh, NC (US); Mark Patrick Delaney, Raleigh, NC (US); Russell Speight VanBlon, Raleigh, NC (US); Nathan J. Peterson, Oxford, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/884,612

(22) Filed: May 27, 2020

(51) Int. Cl.
*H04W 76/10* (2018.01)
*H04W 76/20* (2018.01)
*H04W 4/80* (2018.01)
*H04W 4/48* (2018.01)

(52) U.S. Cl.
CPC ............. *H04W 76/20* (2018.02); *H04W 4/48* (2018.02); *H04W 4/80* (2018.02)

(58) Field of Classification Search
CPC ..... H04W 76/20; H04W 76/10; H04W 76/15; H04W 4/80; H04W 4/48; H04B 3/544; H04B 5/0025
See application file for complete search history.

(56) References Cited

U.S. PATENT DOCUMENTS

| | | | | |
|---|---|---|---|---|
| 10,171,609 | B2 * | 1/2019 | Amrhein | H04W 76/34 |
| 2013/0132286 | A1 * | 5/2013 | Schaefer | H04W 4/44 705/305 |
| 2015/0329121 | A1 * | 11/2015 | Lim | H04W 4/027 701/36 |
| 2018/0191788 | A1 * | 7/2018 | Lewis | G10L 15/1822 |
| 2019/0068718 | A1 * | 2/2019 | Lee | H04L 67/12 |
| 2019/0104559 | A1 * | 4/2019 | Verma | H04W 76/23 |
| 2020/0314742 | A1 * | 10/2020 | Jantzi | H04W 36/26 |

* cited by examiner

*Primary Examiner* — Andrew Wendell
(74) *Attorney, Agent, or Firm* — John M. Rogitz; John L. Rogitz

(57) ABSTRACT

In one aspect, a first device that may be disposed on a vehicle may include at least one processor and storage accessible to the at least one processor. The storage may include instructions executable by the at least one processor to communicate with second and third devices to heuristically determine which of the second and third devices to use to execute a function at the first device. The instructions may also be executable to select one of the second and third devices based on the determination and to, based on the selection, communicate with the selected device to execute the function at the first device.

20 Claims, 6 Drawing Sheets

US 11,083,036 B1

VEHICLE SELECTION OF DEVICE TO USE TO EXECUTE FUNCTION

FIELD

The present application relates to technically inventive, non-routine solutions that are necessarily rooted in computer technology and that produce concrete technical improvements.

BACKGROUND

As recognized herein, when a vehicle's on-board computing system has been paired with multiple mobile devices for streaming music or executing another type of function, the vehicle typically connects to a most-recently used mobile device. Other times, the vehicle's on-board computing system might only be able to save connection data for one mobile device at a time and therefore only pair with that mobile device and no others until its connection data is deleted from memory.

The present application recognizes that the foregoing shortcomings make device pairing and device use in vehicles more complex, opaque, and difficult. There are currently no adequate solutions to the foregoing computer-related, technological problem.

SUMMARY

Accordingly, in one aspect a first device that may, but does not have to be, disposed on a vehicle includes at least one processor and storage accessible to the at least one processor. The storage includes instructions executable by the at least one processor to communicate with second and third devices to heuristically determine which of the second and third devices to use to execute a function at the first device. The instructions are also executable to select one of the second and third devices based on the determination and to, based on the selection, communicate with the selected device to execute the function at the first device.

Thus, in some examples the first device may include an on-board computing system of a vehicle. The instructions may then be executable to receive user input at the first device selecting the function and to communicate with the second and third devices to heuristically determine, based on the user input, which of the second and third devices to use to execute the function at the first device.

So, for example, the instructions may be executable to, based on the user input, identify a type of application to be used to execute the function. The instructions may then be executable to communicate with the second and third devices to heuristically determine which of the second and third devices to use to execute the function at the first device based on the identification of the type of application to use. The determination may thus be based on which of the second and third devices has an application of the identified type stored locally at the respective device.

In some implementations, the instructions may be executable to heuristically determine which of the second and third devices to use to execute the function based on which of the second and third devices currently has more battery power remaining. Additionally or alternatively, the instructions may be executable to heuristically determine which of the second and third devices to use to execute the function based on which of the second and third devices currently has a greater cellular data use allotment remaining, currently has greater cellular signal strength for telephony communication, currently has a greater cellular calling minutes allotment remaining, and/or has endured less dropped calls according to one or more predetermined parameters.

Additionally, in some implementations the function may be a first function, the selected device may be the second device, and the instructions may be executable to pair with the second device to execute the first function. The instructions may then be executable to receive user input to execute a second function different from the first function while paired with the second device, and to communicate with the second and third devices to heuristically determine which of the second and third devices to use to execute the second function based on the user input and while paired with the second device. The instructions may then be executable to select the third device to use to execute the second function and, based on selecting the third device to use to execute the second function, un-pair from the second device and pair with the third device to execute the second function.

In another aspect, a method includes communicating, using a first device disposed on a vehicle, with second and third devices to heuristically determine which of the second and third devices to use to execute a function in conjunction with the first device. The second and third devices may be mobile devices. The method then includes selecting one of the second and third devices based on the determining, communicating with the selected device to receive a stream of data based on the selecting, and executing the function at the first device using the stream of data.

The function may be to initiate a telephone call or text message. Additionally or alternatively, the function may be to play music and/or to provide directions to a destination.

In some implementations, the method may include selecting one of the second and third devices based on which of the second and third devices currently has more battery power remaining, better cellular signal strength, and/or a faster cellular data download rate.

In another aspect, at least one computer readable storage medium (CRSM) that is not a transitory signal includes instructions executable by at least one processor to communicate, at a first device, with second and third devices to determine which of the second and third devices to use to execute a function using the first device. The determination is based on one or more predetermined criteria for execution of the function. The instructions are also executable to select one of the second and third devices based on the determination and to, based on the selection, communicate with the selected device to execute the function using the first device.

In certain examples, the first device may communicate with the second and third devices using Bluetooth communication and the first device may be disposed on a vehicle. In some of these examples, the one or more predetermined criteria may relate to which of the second and third devices currently has more battery power remaining, better cellular signal strength, more cellular telephone minutes available according to a minute allotment, greater available data to download according to a cellular data download limit, and/or a faster cellular data download rate.

In some implementations, the instructions may be executable to communicate with the second and third devices to determine, at the first device, which of the second and third devices to use to execute the function. Additionally or alternatively, the instructions may be executable to communicate with the second and third devices to receive an indication from one of the second and third devices of which of the second and third devices to use to execute the function, where the device to use may be determined by one of the second and third devices or a server in communication with one of the second and third devices.

Also in some implementations, the instructions may be executable to, based on the first device not being able to communicate with one of the second and third devices, select the other of the second and third devices to execute the function.

The details of present principles, both as to their structure and operation, can best be understood in reference to the accompanying drawings, in which like reference numerals refer to like parts, and in which:

DETAILED DESCRIPTION

Figure 1:
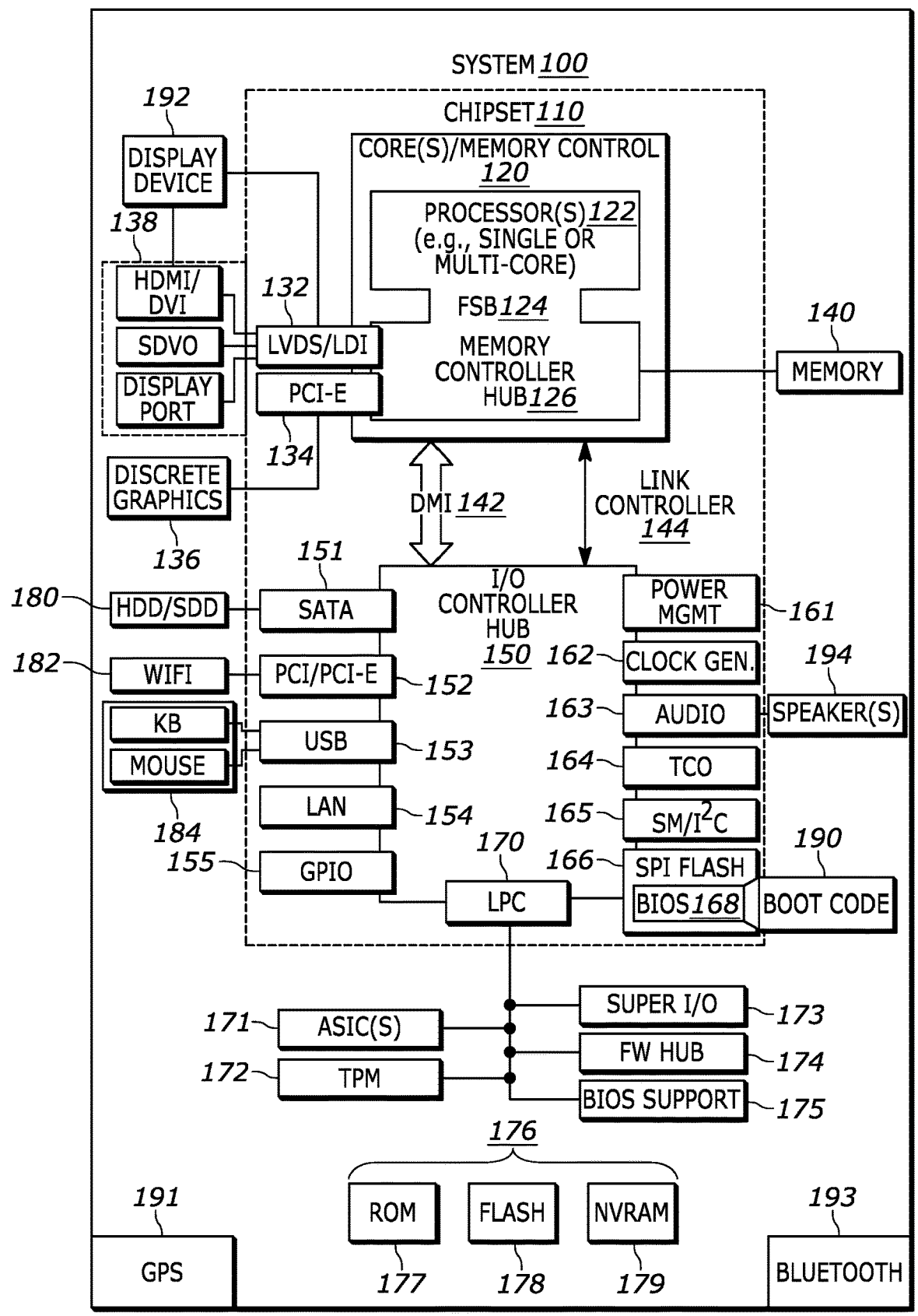
FIG. 1 is a block diagram of an example system consistent with present principles.

The present application is directed to, among other things, multiple mobile devices communicating with a vehicle's Bluetooth system and the vehicle's computer using heuristics to determine the "best" device to pair with in order to execute a given function. Pairing itself may entail not just two devices like the vehicle computer and mobile device communicating with each other, but also the devices establishing a master/slave relationship with each other. In such a relationship, the vehicle's computer may direct and control the functions and operations of the mobile device with which it is paired.

So, for example, the vehicle's computer may determine that an application to be used as stored on one or more of the mobile devices may be data-intensive, such as for streaming music. Based on this, the vehicle's computer may select the mobile device that has the most available data left to download on its data plan and use that device for streaming music. Or, the vehicle's computer may receive a user request to play a particular song or to play songs by a particular artist, and based on this the vehicle's computer may access the local storage of each of the mobile devices to determine which one might have the particular song stored locally, or the most songs by the requested artist stored locally, and then select that device for playing music. In this way, none of the devices would have to go seek out the song or artist over the Internet or a streaming service. Still other criteria may be used as well, such as selecting the mobile device that has access to HD audio via a streaming service as opposed to another mobile device that only has access to SD audio via a streaming service, or selecting the mobile device with HD audio files for the requested artist or song stored locally as opposed to another mobile device that only has SD audio files stored locally for the same requested artist or song.

As another example, the vehicle's computer may determine that whatever mobile device will be used will be connected to the vehicle's computer for an extended period of time, such as to use GPS to navigate to another city. Based on this, the vehicle's computer may select one of the mobile devices that has a sufficient electrical charge to maximize its use for navigation without running out of charge, even if the driver is using a different mobile device to listen to music on the vehicle's speakers. Or, the vehicle's computer might select the mobile device that is plugged into one of the vehicle's power sources rather than using the mobile device's own battery power.

As yet another example, the vehicle's computer may determine which mobile device carrier to use based on a percentage of cell bars that are currently available for each connected mobile device that uses a different carrier. E.g., one mobile device might be using a first cellular service provider and another mobile device might be using a second, different cellular service provider. While at a current location, the current service/signal strength for the first provider might be too little whereas the current service/signal strength for the second provider while still at the same location might be at full strength. Hence, the mobile device using the second provider may be selected for placing a telephone call.

The vehicle's computer (e.g., it's operating system or a certain application) can also factor in past experiences in making the determination of which mobile device to connect to. For example, "Phone A" might have lost connectivity (e.g., accidentally dropped/disconnected from a call) at a particular location that was traveled in the past, but "Phone B" maintained its connectivity and therefore Phone B may be selected when the vehicle is at the same location and seeks to execute a function for which connectivity is needed.

Additionally, a given mobile device might be selected based on the type of application requested by the vehicle's computer to be run/executed.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication and publicly-available Bluetooth specifications, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, in some examples the system 100 may include a global positioning system (GPS) transceiver 191 that is configured to communicate with at least one satellite to receive/identify geographic position information and provide the geographic position information to the processor 122 consistent with present principles. However, it is to be understood that another suitable position receiver other than a GPS receiver may be used in accordance with present principles to determine the location of the system 100.

Still further, the system 100 may include a Bluetooth transceiver and/or other short-range wireless communication transceiver 193 for use consistent with present principles using one or more publicly-available Bluetooth specifications. Thus, the Bluetooth communication transceiver 193 may be a classic Bluetooth transceiver and/or a Bluetooth low energy (BLE) transceiver (e.g., Bluetooth 5.0 transceiver) for communicating with other devices using Bluetooth communication protocols.

Additionally, as alluded to above the transceiver 193 may also be configured for communication using other protocols as well and may therefore establish a Zigbee transceiver, Z-wave transceiver, near field communication (NFC) transceiver, infrared transceiver, a Wi-Fi direct transceiver, and/or wireless universal serial bus (USB) transceiver.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
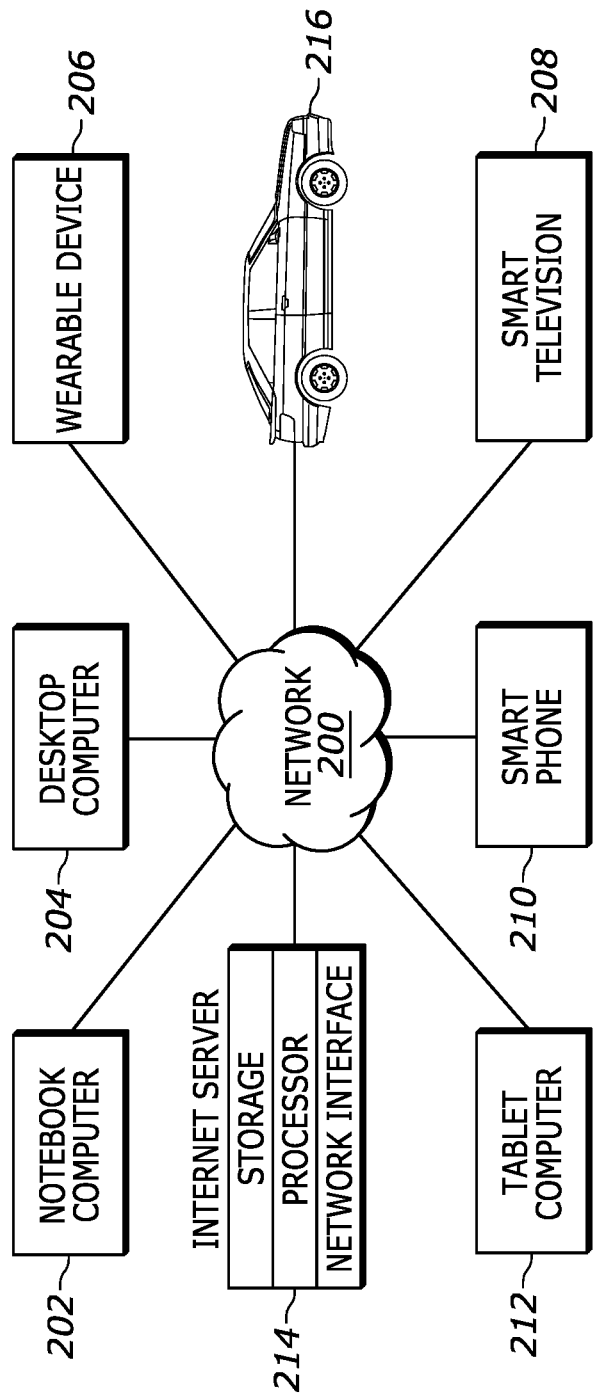
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 216, and a server 214 such as an Internet server that may provide cloud storage accessible to the devices 202-212, 216. It is to be understood that the devices 202-216 may be configured to communicate with each other over the network 200 to undertake present principles.

Figure 3:
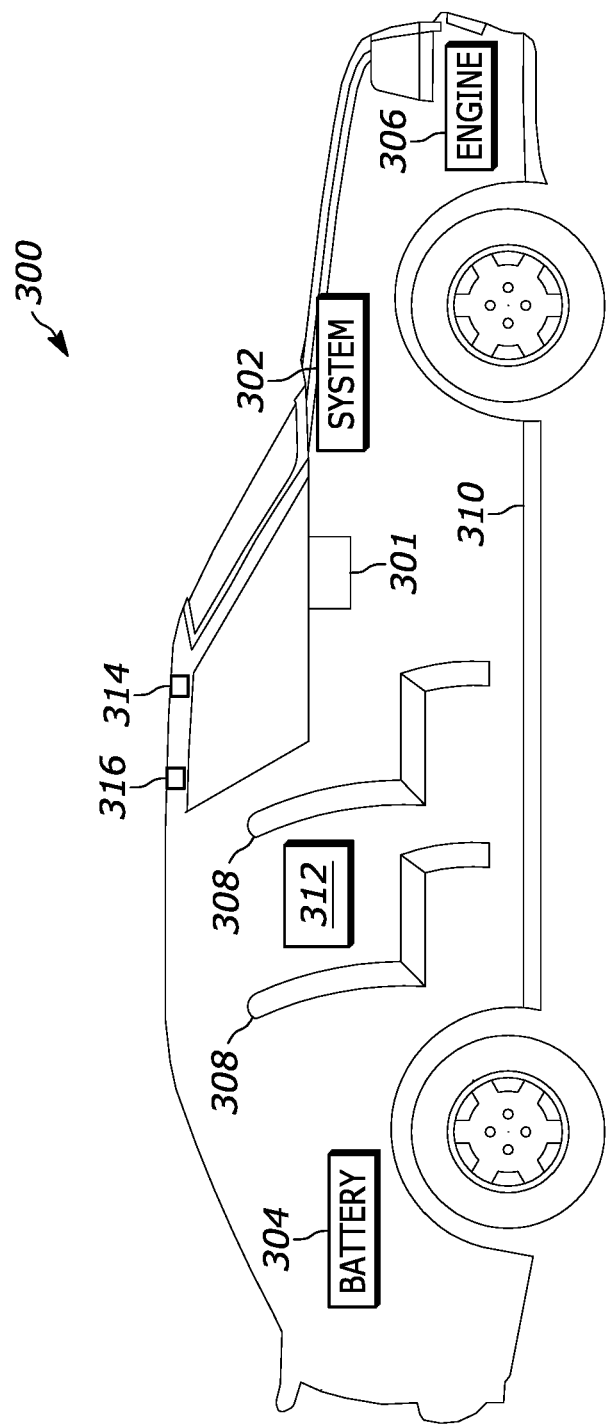
FIG. 3 is a block diagram of an example vehicle consistent with present principles.

FIG. 3 shows an example vehicle 300 that may be similar to the vehicle 216 referenced above, e.g., a car or pickup truck or sport utility vehicle. The vehicle 300 may include an on-board head unit and/or computing system/entertainment system 302 that may include components such as those set forth above in reference to the system 100 in order to operate consistent with present principles. Thus, the computing system 302 may, among other things, include a Bluetooth communication element such as the transceiver 193 for communicating with one or more other devices such as smart phones via Bluetooth communication.

The system 302 may also communicate with and control a battery and/or battery pack 304 that provides power to other parts of the vehicle 300. Additionally, the system 302 may communicate with and control an internal combustion engine 306 that can provide power to propel the vehicle 300 separately from or in conjunction with power from the battery 304 to propel the vehicle 300. The engine 306 may be a fossil fuels-powered engine, such as a gasoline-powered engine or a diesel-powered engine. The vehicle 300 may also include plural seat or chair assemblies 308 that include respective seats in which a driver and passengers of the vehicle 300 may sit. The vehicle 300 may also include a drive train and chassis 310.

Still further, the vehicle 300 may include one or more speakers 312 for outputting audio under control of the system 302, including outputting audio for a digital assistant operated by the system 302, music and podcasts, audible directional assistance from the digital assistant or separate navigational application, audio portions of a telephone call presented using the system 302 in conjunction with a smart phone in the vehicle 300 that communicates with the system over Bluetooth communication, etc. The vehicle 300 may also include a microphone 314 for detecting audible input to the system 302 (such as a voice command to the digital assistant) and/or to be transmitted to another device as part of a telephone call. The digital assistant itself may be established by, for example, Google's Assistant, Amazon's Alexa, Apple's Siri, or another suitable digital assistant.

As also shown in FIG. 3, in some examples the vehicle 300 may include a camera 316 controllable by the system 302. For example, the camera 316 may be controlled to image the faces of people within the vehicle 300 for facial identification, to recognize gestures using gesture recognition, to perform eye tracking using an eye tracking algorithm, to determine a number and location of the people within the vehicle 300, etc.

It is to be further understood that the vehicle 300 may include still other components not shown for clarity, such as brakes for slowing and stopping the vehicle 300 as well as a regenerative braking mechanism for harvesting kinetic energy during braking of the vehicle 300 to charge battery cells within the battery 304. Still other ways of charging the vehicle's battery may be used, such as charging the battery using energy taken from the engine 306 (e.g., using an alternator). The vehicle 300 may also include other mechanisms such as a steering wheel assembly that may include a steering wheel that a user may turn to turn the vehicle 300 left or right and that may be adjustable mechanically and/or electronically. Various mirror assemblies may also be included, including a rear view mirror assembly having a rear view mirror mounted to the windshield of the vehicle 300 as well as side view mirror assemblies with side view mirrors mounted to the front doors of each side of the vehicle 300. The vehicle may also include a suspension system and a heating ventilation and air conditioning (HVAC) system, for example.

Figure 4:
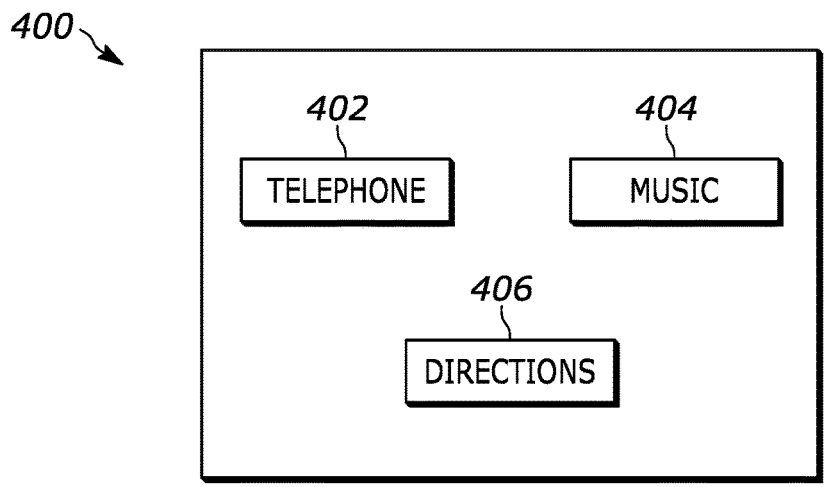
FIG. 4 shows an example graphical user interface (GUI) that may be presented on the on-board display of a vehicle or other device for a user to select a function to execute consistent with present principles.

Now describing FIG. 4, it shows an example graphical user interface (GUI) 400 that may be presented on a touch-enabled electronic display of a vehicle's onboard computing system consistent with present principles. As shown, the GUI 400 may include various selectors 402, 404, and 406 that may be touched to select respective functions to execute using the vehicle's onboard computing system. Thus, selector 402 may be selected in initiate a telephone call, selector 404 may be selected to initiate playing of music using the vehicle's speaker system, and selector 406 may be selected to initiate navigational assistance for providing directions to the user's destination.

Suppose for instance that selector 402 were selected to initiate a telephone call. The selector 402 may thus be selected to cue the computing system and then the user may provide a voice command through the onboard system's microphone to "call John Smith". The system may then use its digital assistant to determine which of the other devices it is currently communicating with over Bluetooth has the capability and/or type of software application ("app") needed to place the telephone call.

Additionally or alternatively, the system may communicate with the other devices to heuristically determine which other device should be used based on one or more predetermined criteria associated with placing a telephone call. For example, only Arnie's phone may have an entry in its electronic contacts list for "John Smith", and hence the vehicle's computing system may select Arnie's phone to place the telephone call through Arnie's phone. As another example, Arnie's phone might have a stronger signal strength for wireless cellular telephone calls at a current location of the vehicle based on whatever cellular towers might be nearby for that phone's wireless cellular service provider. The computing system may therefore determine that Arnie's phone is sending/receiving stronger cellular transmission signals than Nathan's phone can at the same location using a different service provider and thus select Arnie's phone for placing the call.

Figure 5:
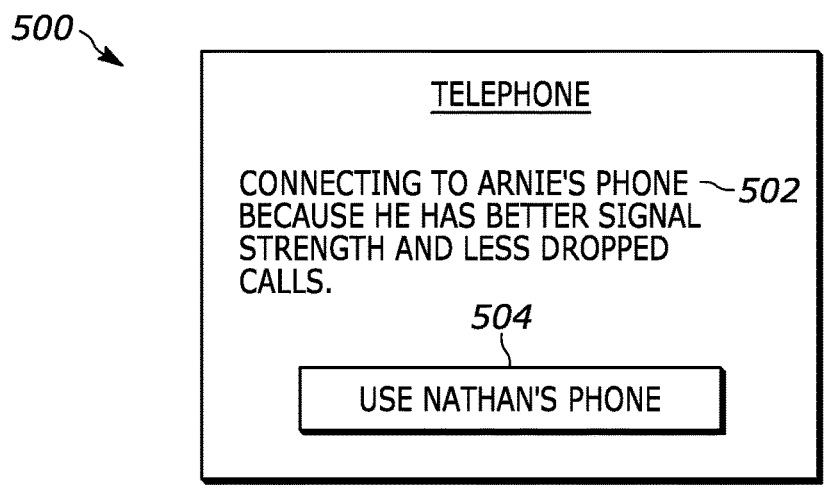
FIGS. 5 and 6 show example GUIs that may be presented on the display based on the function being selected consistent with present principles.

An example of the forgoing is shown in FIG. 5, where a GUI 500 may be presented on the vehicle's onboard display in place of the GUI 400. The GUI 500 may indicate via a prompt 502 that the vehicle is connecting over Bluetooth with Arnie's phone because the vehicle's computing system has determined that Arnie's phone has better signal strength at the current location of the vehicle/phones. While the GUI 500 is presented, the vehicle's system may also control Arnie's phone to launch a phone application stored locally at the phone in order to place the telephone call.

In this example, note that the prompt 502 also indicates that Arnie's phone has experienced less dropped calls while within a threshold radius of the current location than Nathan's phone, such as within three miles. The vehicle's system may have determined as much by accessing respective dropped call histories stored locally at each respective phone, and/or at the vehicle's system itself, to determine which phone has dropped/disconnected from less telephone calls while within the current threshold radius. The dropped call histories themselves may therefore indicate not only a date and time of a respective dropped call but also a location at which it occurred. GPS coordinates may be indicated, for example, based on an output from the phone's GPS transceiver indicating a current location at the time the call was dropped.

Furthermore, in certain non-limiting examples the vehicle's system may determine dropped calls not just according to the threshold radius but also by using only dropped calls that occurred within a threshold time of a current time for its determination. For example, the vehicle's system might only count dropped calls that occurred within one month of a current date and time for determining which phone to use based on less dropped calls. The threshold radius and the threshold time may be set by a software developer or device manufacturer, for instance. In other examples, they may be set by an end-user using a graphical user interface such as one similar to the GUI 800 of FIG. 8, described below.

Still in reference to FIG. 5, also note that the GUI 500 may include a selector 504 that may be selected by the end-user or vehicle driver to command the vehicle's system to use Nathan's phone rather than Arnie's phone to place the requested telephone call. In response to selection of the selector 504, the vehicle's system may one or more both of unpair from Arnie's phone and establish Bluetooth pairing with Nathan's phone.

Next assume as another example that selector 406 were selected from the GUI 400. This action may initiate navigational assistance for directions to the user's destination to be provided by the vehicle's computing system using a navigational assistance app executing on one of the phones as well as the vehicle's own display and speakers to output the directions to the user as provided by the app itself over Bluetooth communication.

The system may thus determine, based on selection of the selector 406, which of the mobile devices it is currently communicating with over Bluetooth has the capability or type of software app needed to provide navigational assistance. For instance, the system may determine which device has hardware like a GPS transceiver as well as an app such as Google Maps (or another direction-providing navigational application) in order to provide directions using those items.

Additionally or alternatively, the system may also communicate with the mobile devices to heuristically determine which one should be used based on one or more predetermined criteria associated with navigational assistance. For example, Nathan's phone may have a battery with a higher current state of charge than the battery in Arnie's phone (e.g., on a scale from zero to one hundred) and/or a greater amount of stored energy remaining than the battery in Arnie's phone (e.g., if Nathan's phone has a lower current state of charge but is a much bigger battery/has more capacity in general, and therefore still currently has more stored power remaining than Arnie's battery with its smaller capacity but higher current state of charge). Alternatively, the system may determine that Nathan's phone is connected via a universal serial bus (USB) cord to a separate charge/power source such as a cigarette lighter or USB port on the vehicle itself, whereas Arnie's device is running on its own battery power alone. Since providing navigational assistance can consume a relatively large amount of power, in either of those two instances Nathan's device may be selected for providing navigational assistance. The vehicle's computing system may then control Nathan's phone to automatically launch a navigational assistance app stored locally at Nathan's device and provide directions to a destination Arnie or Nathan might have verbally provided to the vehicle's system via its microphone. The vehicle's system may command Nathan's phone using Bluetooth commands according to one or more publicly-available Bluetooth specifications, for example.

Figure 6:
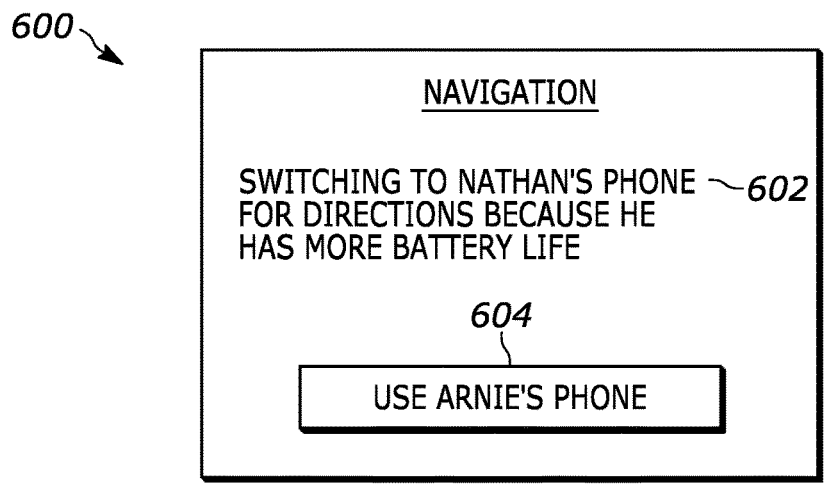

A GUI 600 according to the navigational assistance scenario outlined above is shown in FIG. 6. The GUI 600 may be presented on the vehicle's onboard display in place of the GUI 400 responsive to selection of the selector 406, and/or in place of the GUI 500 responsive to a voice command or other command to provide directions to a destination. The GUI 600 may indicate via a prompt 602 that the vehicle is switching from using resources from Arnie's phone to using resources from Nathan's phone via Bluetooth communication, such as to use the GPS transceiver and navigational assistance app on Nathan's device for providing directions. The prompt 602 may also indicate that the reason for the switch is that the vehicle's computing system has determined that the battery in Nathan's phone currently has a higher state of charge than the battery in Arnie's phone. While the GUI 600 is presented, the vehicle's system may also control Nathan's phone to launch the navigational assistance app stored locally at Nathan's phone in order to provide the requested navigational assistance.

As also shown in FIG. 6, the GUI 600 may include a selector 604 that may be selected by the user to command the vehicle's system to use Arnie's phone rather than Nathan's phone to provide the navigational assistance. In response to selection of the selector 604, the vehicle's system may therefore one or more both of unpair from Nathan's phone and establish Bluetooth pairing with Arnie's phone in order to provide the navigational assistance.

Figure 7:
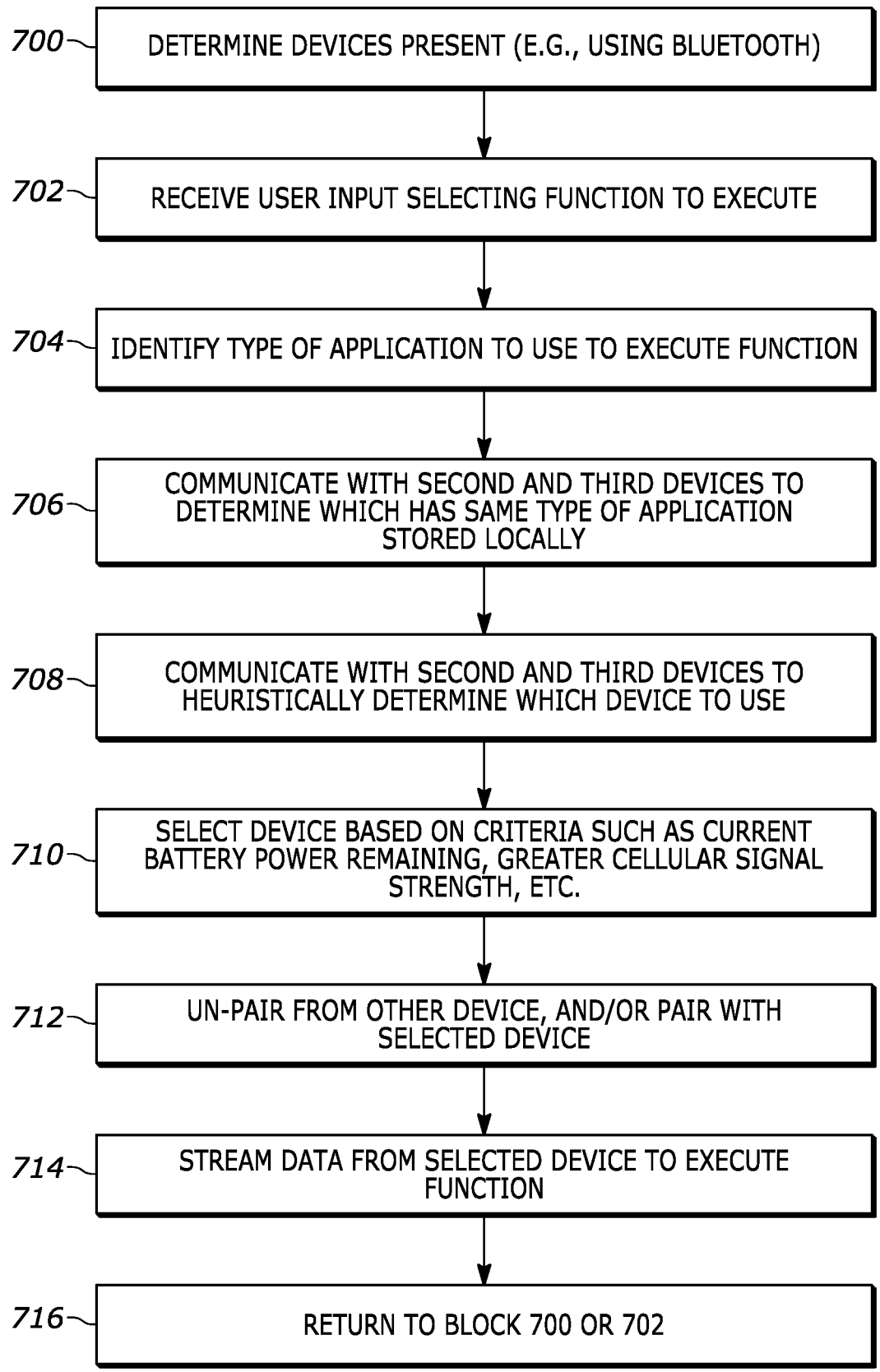
FIG. 7 shows a flow chart of an example algorithm that may be executed by a device operating consistent with present principles.

Now in reference to FIG. 7, it shows example logic that may be executed by a first device such as the system 100 and/or a vehicle's onboard computing system consistent with present principles. Beginning at block 700, the first device may attempt Bluetooth communication with any other devices that might be within signal range. The logic may then move to block 702 where the first device may receive user input selecting a function to execute, as might be received at the GUI 400 described above, for example.

From block 702 the logic may then proceed to block 704 where the first device may identify a type of application(s) to use to execute the selected function. To do so, for example, the first device may access a relational database stored locally on the first device's hard disk or solid state drive that indicates respective application types for respective functions that the user might select. From block 704 the logic may then proceed to block 706.

At block 706 the first device may communicate with second and third devices via Bluetooth or other communication (and potentially communicate with more devices if Bluetooth communication was established with additional devices at block 700 beyond the second and third devices) to determine which of those devices has the same type of application stored locally on its own respective local storage as the type of application identified at block 704. For example, at block 706 the first device may access the respective application lists for the second and third devices as stored locally at those respective devices. The first device may then parse the applications lists to identify any applications of the identified type. Individual applications themselves may be associated with various application types in another relational database accessible to the first device. However, also note that other ways of determining applications on each mobile device to use to execute the function may also be employed, such as accessing the second or third device's local storage to determine from the storage itself which applications might already be stored locally at different storage locations and match the type identified at block 704.

If only one of the second and third devices has an application stored locally that conforms to the identified type and thus can be used to execute the function, the second or third device with that application may be selected by the first device to execute the function. Similarly, if only one of the second and third devices is within signal range or otherwise able to communicate with the first device, then that device may be selected by the first device to execute the function.

However, assuming both the second and third devices (and any other devices with which Bluetooth communication was established at block 700) have at least one application of the same type as identified at block 704 and are in communication with the first device, the logic of FIG. 7 may proceed from block 706 to block 708.

At block 708 the first device may communicate with the second and third devices (and any other devices with which Bluetooth communication was established) to heuristically determine which device to use as described herein. The determination(s) may be made by communicating with the second and third devices to access relevant data stored locally at the respective second or third device to make the determination(s), such as metadata for various files and/or applications. The determination(s) may also be made by receiving or accessing data reported by one or more monitoring/reporting applications or other software that might be running at the second or third device itself.

For example, at block 708 the first device may determine that the function relates to facilitating a telephone call and therefore the first device may determine at block 708 which of the second and third devices has greater cellular signal strength for telephony communication and/or has a greater cellular calling minutes allotment remaining (e.g., according to a cellular plan where a certain number of minutes per month are included as part of the plan at no extra cost). Signal strength may be determined by executing, for example, an application programming interface (API) at the first device to access the reporting or cellular provider software executing at the other device that itself indicates signal strength as a number of signal "bars" (e.g., as also shown on the top right of the display of the second or third device itself). The reporting or cellular provider software might also indicate signal strength as a particular signal strength number in the signal strength scale, as determined based on the strength of signals sensed by its respective cellular communication transceiver.

Minutes allotments may be determined by accessing data stored locally at the second or third device that indicates minutes used and/or minutes remaining according to the respective device's monthly allotment. For instance, the reporting or cellular provider software executing at the second and third devices may be accessed to determine minutes allotments. Additionally or alternatively, the first device might determine at block 708 which of the second and third devices has endured less dropped calls according to one or more predetermined parameters such as those described above in reference to FIG. 5, where the dropped calls themselves might be indicated in a history stored at the second or third device as also disclosed above.

As another example, at block 708 the first device may determine that the function relates to sending a text message (e.g., short message service (SMS) message). Therefore the first device may determine at block 708 which of the second and third devices has greater cellular signal strength for text message communication and/or has a greater text message number allotment remaining (e.g., according to a cellular plan where a certain number of text messages sent per month are included as part of the plan at no extra cost). Signal strength may be determined as set forth above, while text message allotments may be determined by accessing data stored at the second or third device that indicates texts messages sent and/or text messages remaining to be sent according to the allotment as might be provided by the reporting software itself executing on the other device. Additionally or alternatively, the first device might determine which of the second and third devices has endured less unsuccessfully sent text messages according to one or more predetermined parameters similar those described above in reference to FIG. 5 (e.g., less unsuccessful transmissions within a predetermined radius of a current location of the first device and/or less unsuccessful transmissions within a threshold time of a current time). Unsuccessfully sent text messages may also be indicated in a device history for the second or third device, and/or in a history for a text messaging app in particular.

As yet another example, at block 708 the first device may determine that the function relates to streaming a video from YouTube, streaming music from an online service, or accessing other Internet content via a website. Therefore the first device may determine at block 708 which of the second and third devices currently has more battery power remaining since streaming over the Internet can be power-intensive, and/or which of the second and third devices has a greater cellular data use allotment remaining to download data over the Internet according to a cellular data download limit (e.g., according to a cellular plan where a certain amount of data may be downloaded by the respective device per month as part of the plan at no extra cost). Cellular data use allotment may be determined by accessing data stored at the second or third device or the reporting software itself that indicates gigabytes of data remaining that may be download and/or gigabytes already used according to the allotment. Furthermore, in some examples if one of the second and third devices has unlimited data to download according to its download limit and the other does not have unlimited data, the device with the unlimited data to download may be selected.

Battery power remaining may be determined by executing, for example, an application programming interface (API) at the first device to access different reporting software executing at the second or third device that indicates its battery's current state of charge as a percentage from zero (no charge) to one hundred (fully charged) and/or that indicates the total current amount of stored power remaining. The second or third device's battery management unit (BMU) in the battery pack itself may also be accessed to determine the current state of charge and/or total amount of power currently remaining for the respective device's battery. Additionally or alternatively, the first device may simply select the respective device with a respective battery having the greater total energy storage capacity in general, and/or determine that one of the second and third devices is currently being charged and/or is plugged into another power source (such as the vehicle's USB port or cigarette lighter) and select that device over another device that is not plugged into an external power source.

Still further, the first device might determine which of the second and third devices has a faster cellular data download rate at its current location for streaming or accessing Internet content, which might vary between the second and third devices even if both are at the same location since they might have different cellular service providers and one of the providers might have a closer cellular tower and hence can provide a stronger 4G or 5G cellular signal for data downloads. Data download rates may also be determined by accessing the reporting or cellular provider software executing at the second or third device that indicates download rate according to, e.g., 4G or 5G communication. Download rate may be expressed in a number of bytes per second, for example.

Still in reference to FIG. 7, from block 708 the logic may next proceed to block 710 where the first device may select either of the second and third devices based on the outcome of the determination(s) performed at block 710 as set forth above. So, for example, the device with the higher remaining state of charge for its battery may be selected, or the device with the better signal strength may be selected.

However, also note that in some examples where more than one criteria is used for the heuristic determination(s) of which of the second and third device to use, but each of those devices matches a different criteria better than the other respective device, then at block 710 the first device may apply preestablished weights that are associated with the different criteria in order to select the device with satisfying criteria that is cumulatively weighted higher than satisfying criteria of the other device. For example, a device or app developer may have preestablished the weights, or the end-user of the first device may have himself or herself established the weights. Then if the second device matches first and second criteria better while the third device matches a third criterion better, then the various weights for the first and second criteria may be added together and compared to the weight of the third criterion. The associated device with the higher total weight may then be selected.

Or, if a simple priority is established by the developer or end-user where one criterion is to always be prioritized over another criterion, then the respective mobile device that matches whatever criterion has the higher priority may be selected. For example, battery power remaining may have the highest priority, signal strength may have lower priority, and minutes remaining per an allotment may have an even lower priority. Then whichever one of the second and third devices matches the criterion with the highest priority from among those may be selected over another device that does not match any of the criterion or that only matches a criterion with a lower priority.

From block 710 the logic may then proceed to block 712. At block 712 if the first device is currently paired to one of the second or third devices but the other mobile device was selected at block 710, then the first device may unpair with the mobile device that was not selected. Additionally or alternatively, at block 712 the first device may then pair with the selected mobile device.

However, note that in other implementations the first device may not un-pair or otherwise disconnect from the mobile device that was not selected at block 710. Instead, the first device may maintain pairing or connection with that mobile device (e.g., to continue executing another function such as playing music concurrently with the function selected at block 702) while also pairing/connecting to the selected mobile device in order to execute the selected function. So, for example, the first device may use the second device to stream music from the second device to play over the vehicle's speakers, then receive user input to provide navigational assistance, and then concurrently communicate with both the second device to play music and the third device to concurrently provide navigational assistance.

From block 712 the logic may then proceed to block 714. At block 714 the first device may control the selected device to stream data from it to execute the selected function. Streaming data may include, for example, streaming audio of a telephone call from the selected device as well as streaming microphone input to the selected device as part of the telephone call. Streaming data may also include streaming music from the selected device or streaming voice commands to the selected device for a digital assistant on the selected device to execute a function. Streaming data may also include still other items disclosed herein, such as streaming a voice command to the selected device to send a text message to a contact indicated in the voice command using words indicated in the voice command, or receiving step-by-step navigational directions from the selected device after indicating to the selected device the user's desired destination.

From block 714 the logic may then proceed to block 716. At block 716 the logic may end, or it may return to either of blocks 700 or 702 to proceed again from that block to execute another function.

However, before moving on in the detailed description, reference is first made back to blocks 706-710. Note that in some examples, rather than the first device determining which of the second and third devices has an application of a certain type that will be used at block 706 and/or heuristically determining which of the second and third devices to use at block 708 and then selecting one of those devices at block 710, after block 704 the first device may instead execute a step where it communicates the function to be executed to the second and third devices along with network connection information for the second and third devices to communicate amongst themselves. The first device may then also command the second and third devices to work it out amongst themselves as to which of the second and third devices to use. To do so, the second and third devices may themselves execute steps similar to those described above in reference to blocks 706 and 708 in a distributed networking embodiment. In some examples, the second and/or third device may even communicate with a fourth device established by a remotely-located server for making the determinations and ultimately the device selection. The first device may then receive an indication of the device selection from one or both of the second and third devices at block 710 and then proceed to block 712 as described above.

Figure 8:
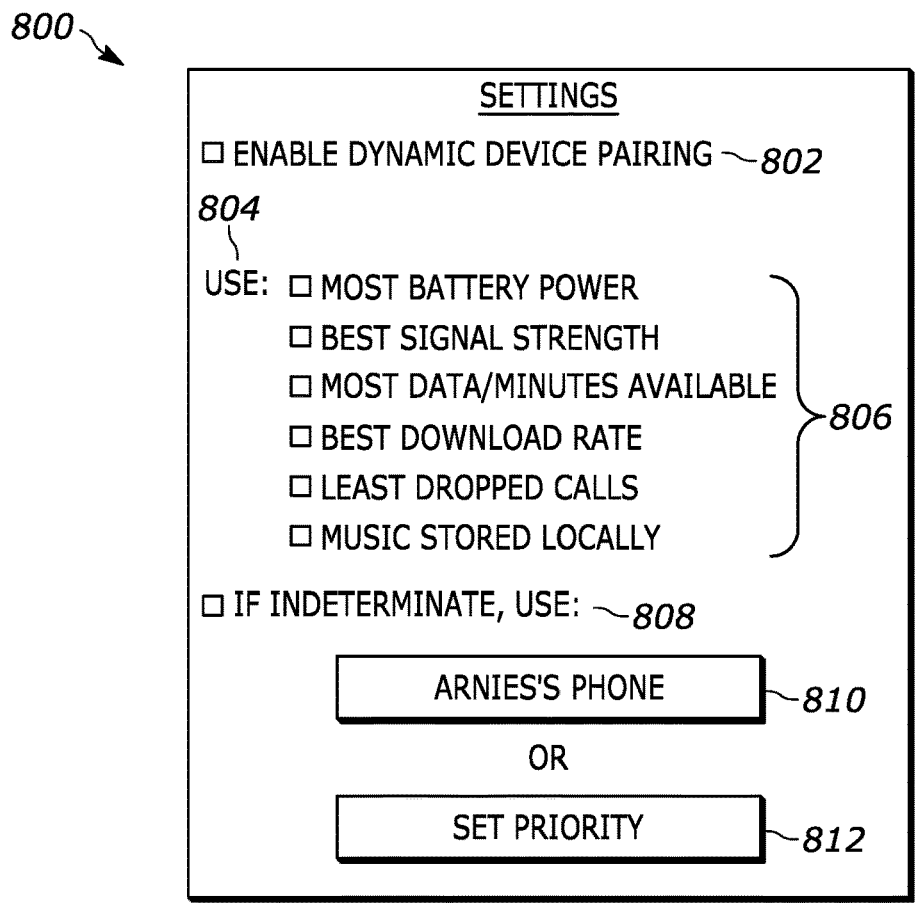
FIG. 8 shows an example GUI that may be presented on the display for configuring one or more settings of the device consistent with present principles.

Now in reference to FIG. 8, it shows an example GUI 800 that may be presented on the on-board display of a vehicle's computing system or that may be presented on the display of another device for configuring settings of the system consistent with present principles. It is to be understood that each of the options to be discussed in reference to FIG. 8 may be selected by an end-user by directing touch or cursor input to the respective check box adjacent to the respective option.

Accordingly, as shown in FIG. 8 the GUI 800 may include a first option 802 that may be selectable to set or enable the on-board computing system to, in the future, perform dynamic device pairing consistent with present principles. For example, selection of the option 802 may set or configure the system to execute the functions described above in reference to FIGS. 4-6 as well as to execute the logic of FIG. 7.

The GUI 800 may also include a setting 804 at which the end-user may select one or more criteria for the system to use for selecting another device with which to communicate to execute a function. Thus, various options 806 may be selected, such as using the respective device currently with the most battery power remaining, using the respective device that currently has more signal strength, using the respective device that currently has more telephone minutes or data available to download remaining according to an allotment, using the respective device that currently has the faster data download rate, using the respective device that has the least amount of dropped calls, or using the respective device that has music stored locally at it (rather than having to be streamed from a remotely-located server, for example, if a request is received to play music). Still other options may also be presented but are not shown for simplicity, such as an option to use the respective device that has access to a high-definition (HD) audio streaming service as opposed to a standard definition (SD) audio streaming service accessible to a different device, or an option to use the respective device that supports HD audio and/or has HD audio files stored locally as opposed to using a different device that only supports SD audio and/or has SD audio files stored locally. In certain examples, HD audio itself may be established by audio having greater than a 44.1 kHz sample rate and/or higher than 16-bit audio bit depth.

FIG. 8 also shows that an option 808 may be presented. The option 808 may be selected to enable the system, if there is a conflict as to which mobile device to use based on both devices better-matching different criteria (e.g., where the cumulative weights are equal) or both matching a same highest-priority criterion, to default to a predetermined mobile device by a selecting selector 810 associated with that mobile device. In this case, the predetermined device is Arnie's device as indicated via text on the face of the selector 810 itself.

However, note that a selector 812 as also presented on the GUI 800 may also be selected, where selection of selector 812 may cause another GUI to be presented at which a user may establish a priority for various criteria as set forth herein. An example of such a GUI is shown in FIG. 9.

Figure 9:
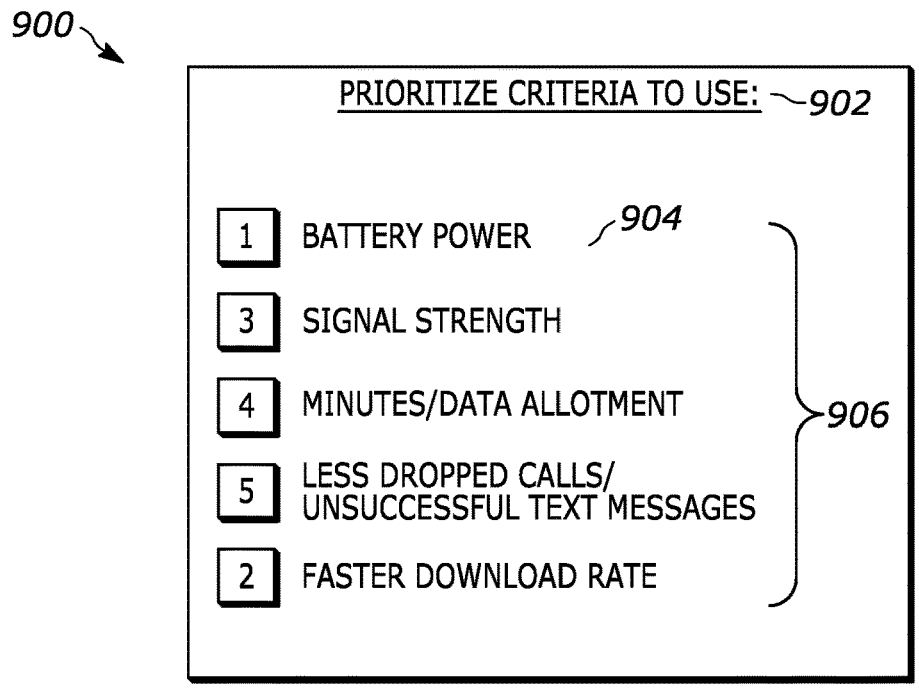
FIG. 9 shows an example GUI that may be presented on the display for ranking various criteria that may be used for determining another device to which to connect consistent with present principles.

Accordingly, reference is now made to the GUI 900 of FIG. 9. As shown, the GUI 900 may include a prompt 902 requesting that the end-user prioritize various criteria. The GUI 900 may also list the various criteria 904 as shown and may include a respective input box 906 next to each one. The user may then use a hard or soft keyboard or keypad to enter different whole numbers to establish the priority for the criteria. Higher-ranked/prioritized criteria may have lower numbers than other criteria. In this example as shown in FIG. 9, the end-user has ranked battery power remaining as the highest-prioritized criteria. Other criteria of lower priorities have also been ranked as shown, with less dropped calls or unsuccessful text message transmissions being the lowest-prioritized criterion.

Further note that while in some examples the ranking of the criteria shown in FIG. 9 may be applied "globally" at the first device regardless of function to execute or application to use, in some examples the criteria may be ranked using a GUI like the GUI 900 for individual functions to execute or applications to use. For example, the GUI 900 may be used to rank criteria for determining which of a second and third device to use for navigational assistance in particular, and then a similar GUI may be used for determining which of a second and third device to use for making a telephone call.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   communicate with second and third devices to heuristically determine which of the second and third devices to use to execute a first function at the first device;
   select the second device based on the determination and pair with the second device to execute the function;
   based on the selection of the second device, communicate with the second device to execute the first function at the first device;
   while paired with the second device, receive user input to execute a second function different from the first function;
   based on the user input and while paired with the second device, communicate with the second and third devices to heuristically determine which of the second and third devices to use to execute the second function;
   select the third device to use to execute the second function; and
   based on selecting the third device to use to execute the second function, un-pair from the second device and pair with the third device to execute the second function.

2. The first device of claim 1, wherein the first device comprises an on-board computing system of a vehicle, and wherein the first device comprises the vehicle.

3. The first device of claim 2, wherein the instructions are executable to:
   receive, at the first device, user input selecting the first function; and
   based on the user input, communicate with the second and third devices to heuristically determine which of the second and third devices to use to execute the first function at the first device.

4. The first device of claim 3, wherein the instructions are executable to:
   receive the user input selecting the first function;
   based on the user input, identify a type of application to be used to execute the first function; and
   based on the identification of the type of application to use, communicate with the second and third devices to heuristically determine which of the second and third devices to use to execute the first function at the first device, the determination based on which of the second and third devices has an application of the identified type stored locally at the respective device.

5. The first device of claim 1, wherein the instructions are executable to:
   heuristically determine which of the second and third devices to use to execute the first function based on which of the second and third devices currently has a greater cellular data use allotment remaining.

6. The first device of claim 1, wherein the instructions are executable to:
   heuristically determine which of the second and third devices to use to execute the first function based on which of the second and third devices currently has greater cellular signal strength for telephony communication.

7. The first device of claim 1, wherein the instructions are executable to:
   heuristically determine which of the second and third devices to use to execute the first function based on which of the second and third devices currently has a greater cellular calling minutes allotment remaining.

8. The first device of claim 1, wherein the instructions are executable to:
heuristically determine which of the second and third devices to use to execute the first function based on which of the second and third devices has endured less dropped calls according to one or more predetermined parameters.

9. A method, comprising:
identifying a type of application to be used to execute a function in conjunction with a first device disposed on a vehicle;
communicating, using the first device disposed on the vehicle, with second and third devices to heuristically determine which of the second and third devices to use to execute the function in conjunction with the first device based on which of the second and third devices has an application of the identified type stored locally at the respective device;
selecting, based on the determining, one of the second and third devices that has an application of the identified type stored locally at the respective device;
communicating, based on the selecting, with the selected device to receive a stream of data; and
executing, at the first device, the function using the stream of data.

10. The method of claim 9, wherein the method comprises:
selecting one of the second and third devices based on which of the second and third devices currently has a faster cellular data download rate.

11. The method of claim 9, wherein the identifying is performed by the first device.

12. The method of claim 9, wherein the function is a first function, and wherein the method comprises:
pairing with the second device to receive the stream of data;
while paired with the second device, receiving user input to execute a second function different from the first function;
based on the user input and while paired with the second device, communicating with the second and third devices to heuristically determine which of the second and third devices to use to execute the second function;
selecting the third device to use to execute the second function; and
based on selecting the third device to use to execute the second function, un-pairing from the second device and pairing with the third device to execute the second function.

13. The method of claim 9, comprising:
communicating with the second and third devices to heuristically determine which of the second and third devices to use to execute the function in conjunction with the first device based on which of the second and third devices currently has a greater cellular data use allotment remaining.

14. The method of claim 9, comprising:
communicating with the second and third devices to heuristically determine which of the second and third devices to use to execute the function in conjunction with the first device based on which of the second and third devices currently has a greater cellular calling minutes allotment remaining.

15. The method of claim 9, comprising:
communicating with the second and third devices to heuristically determine which of the second and third devices to use to execute the function in conjunction with the first device based on which of the second and third devices has endured less dropped calls according to one or more predetermined parameters.

16. At least one computer readable storage medium (CRSM) that is not a transitory signal or a propagating electrical signal or an electromagnetic signal per se or a carrier wave, the computer readable storage medium comprising instructions executable by at least one processor to:
communicate, at a first device, with second and third devices to determine which of the second and third devices to use to execute a function using the first device, the determination being based on one or more predetermined criteria for execution of the function, the one or more predetermined criteria comprising which of the second and third devices currently has a greater cellular data use allotment remaining;
select one of the second and third devices based on the determination; and
based on the selection, communicate with the selected device to execute the function using the first device.

17. The CRSM of claim 16, wherein the first device communicates with the second and third devices using Bluetooth communication, wherein the first device is disposed on a vehicle, and wherein at least one of the one or more predetermined criteria relate to which of the second and third devices currently has one or more of: more cellular telephone minutes available according to a minute allotment, a faster cellular data download rate.

18. The CRSM of claim 16, wherein the instructions are executable to:
communicate with the second and third devices to receive an indication from one of the second and third devices of which of the second and third devices to use to execute the function, the device to use being determined by one of the second and third devices or a server in communication with one of the second and third devices.

19. The CRSM of claim 11, wherein the function is a first function, and wherein the instructions are executable to:
pair with the second device to execute the first function;
while paired with the second device, receive user input to execute a second function different from the first function;
based on the user input and while paired with the second device, communicate with the second and third devices to determine which of the second and third devices to use to execute the second function;
select the third device to use to execute the second function; and
based on selecting the third device to use to execute the second function, un-pair from the second device and pair with the third device to execute the second function.

20. The CRSM of claim 16, wherein the instructions are executable to:
identify a type of application to be used to execute the function, wherein the one or more predetermined criteria comprise which of the second and third devices has an application of the identified type stored locally at the respective device.

* * * * *